No. 778,842. PATENTED JAN. 3, 1905.
J. G. BOUCHARD.
HEATER OR COOLER FOR LIQUIDS.
APPLICATION FILED NOV. 11, 1903.
3 SHEETS—SHEET 1.
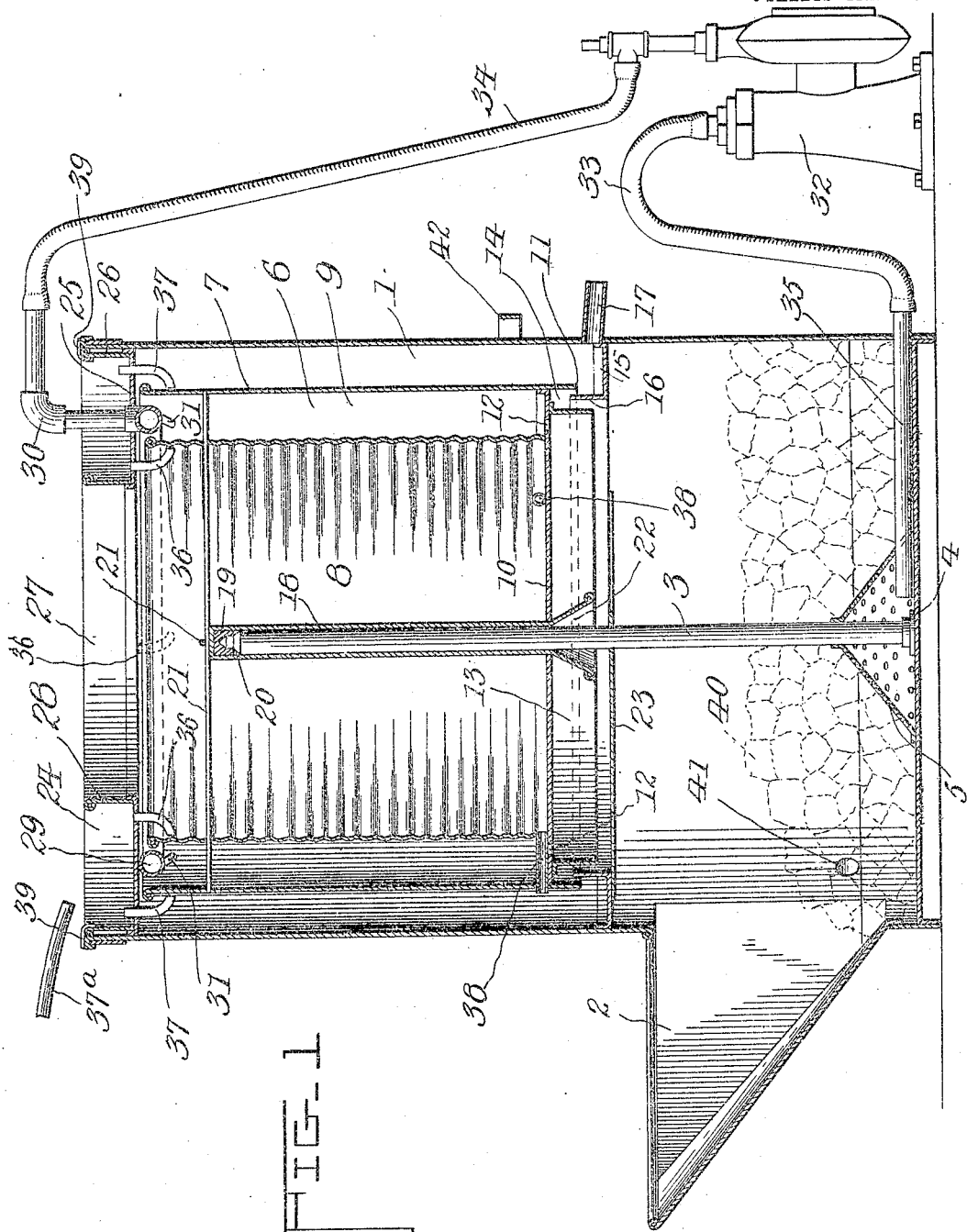
FIG_1
Witnesses:
Ed. Page
F.D. Ammen
Joseph G. Bouchard, Inventor
By Marion & Marion
Attorneys

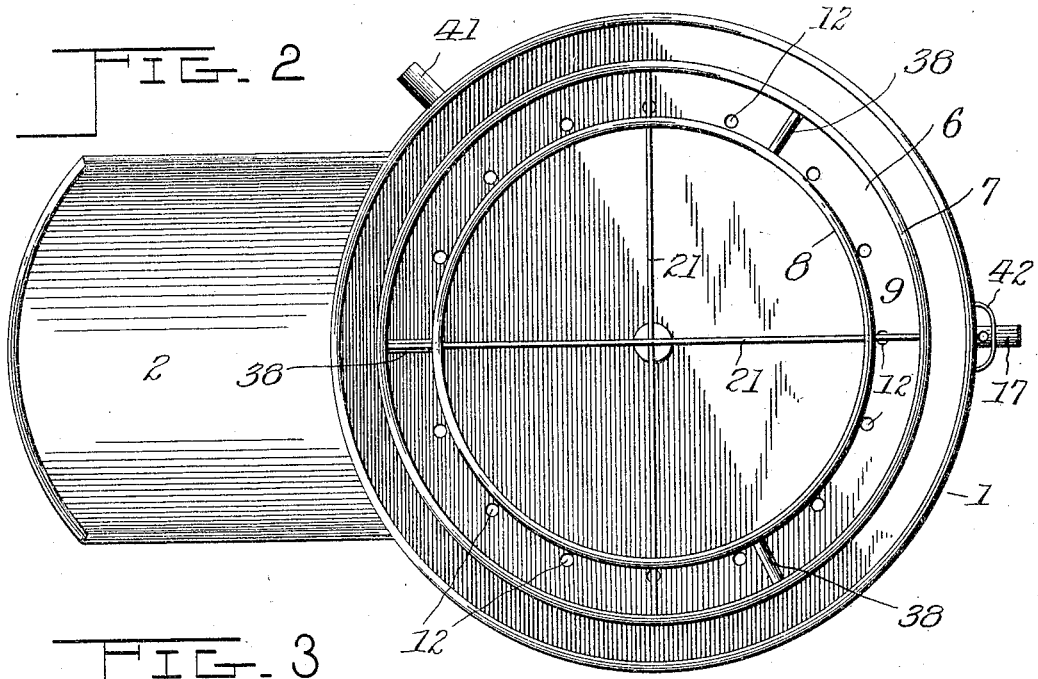
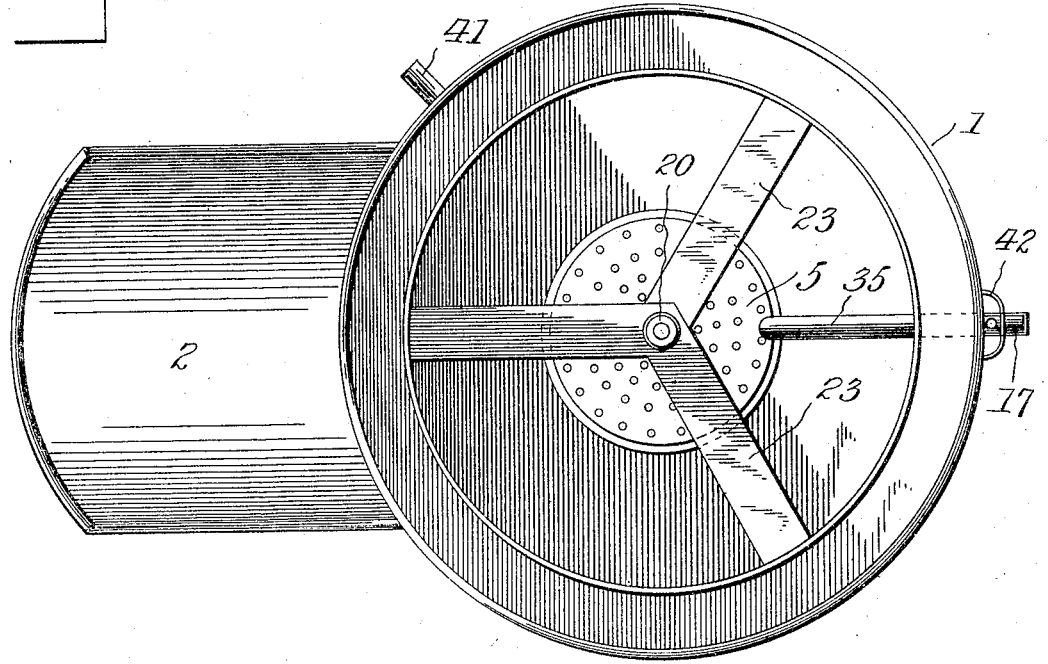

No. 778,842. PATENTED JAN. 3, 1905.
J. G. BOUCHARD.
HEATER OR COOLER FOR LIQUIDS.
APPLICATION FILED NOV. 11, 1903.
3 SHEETS—SHEET 3.
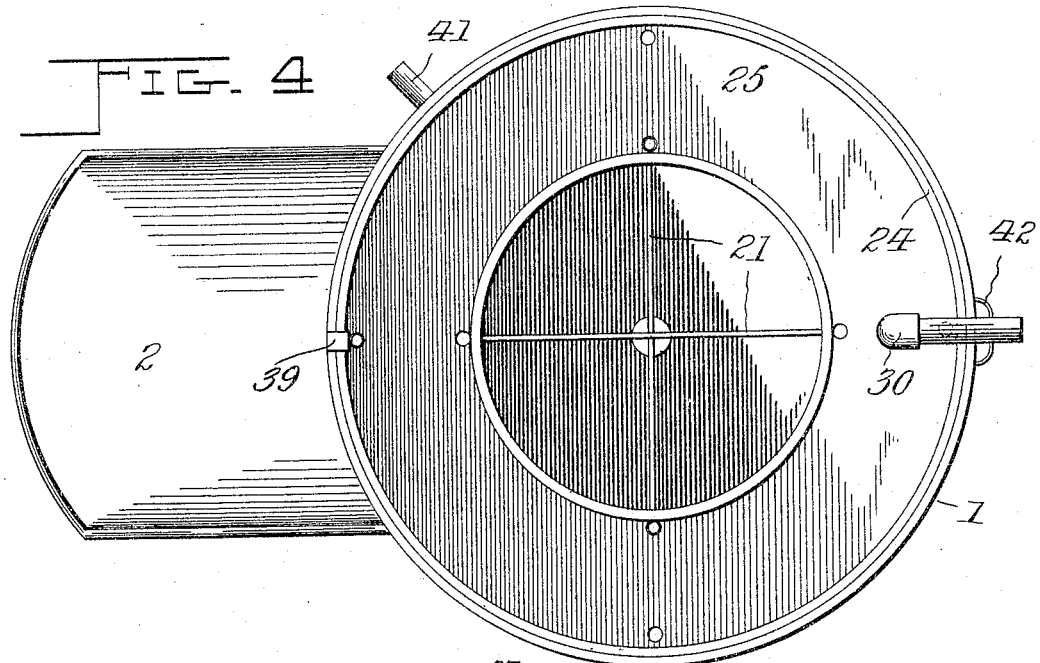
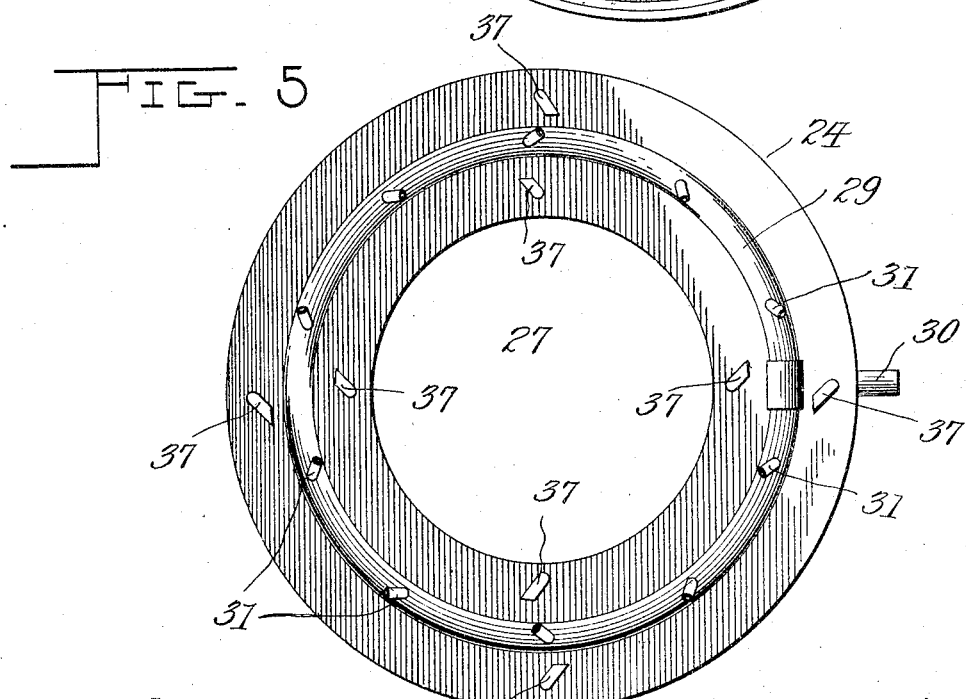
Witnesses:
Joseph G. Bouchard, Inventor,
By Marion & Marion
Attorneys No. 778,842. Patented January 3, 1905.

UNITED STATES PATENT OFFICE.

JOSEPH GEORGES BOUCHARD, OF ST. HYACINTHE, CANADA.

HEATER OR COOLER FOR LIQUIDS.

SPECIFICATION forming part of Letters Patent No. 778,842, dated January 3, 1905.

Application filed November 11, 1903. Serial No. 180,669.

*To all whom it may concern:*

Be it known that I, JOSEPH GEORGES BOUCHARD, residing at St. Hyacinthe, in the county of St. Hyacinthe, in the Province of Quebec, in the Dominion of Canada, have invented certain new and useful Improvements in Heaters or Coolers for Liquids; and I do hereby declare that the following is a full, clear, and exact description of the invention, such as will enable others skilled in the art to which it appertains to make and use the same.

My invention relates to apparatus for the treatment of cream, and especially to the apparatus in which cream may be treated for the purpose of raising or lowering its temperature. In other words, the invention concerns itself with the construction of a heater or cooler for cream. When used in the former capacity, the apparatus constitutes a pasteurizer, and when used as a cooler the apparatus is useful in preparing the milk for the processes of separating the cream from the milk.

In its general construction the invention comprises a vessel or barrel, in the upper portion of which a rotatable drum is mounted. The lower portion of this vessel is adapted to receive broken ice when the apparatus is being used as a cooler, and a circulating-pump is adapted to raise the water from the bottom of the vessel, and this water is projected against a wall of the said drum in such a manner as to bring about a rotation of the drum. It should be stated that the water is thrown against the drum near its upper portion and gravitates downwardly and eventually finds its way again to the bottom of the inclosing vessel. Arrangement is made for projecting the cream upon the said rotatable drum with the object of affecting the temperature of the cream by means of the circulating water.

The object of the invention is to produce an improved construction of the kind suggested which will present a relatively large area of heating or cooling surface and to provide special arrangements for preventing in a simple manner the mixture of the circulating water and the cream.

The invention consists in the construction and combination of parts to be more fully described hereinafter, and definitely set forth in the claims.

In the drawings, which fully illustrate my invention, Figure 1 is a vertical central section of the apparatus. Fig. 2 is a plan of the apparatus with its cover removed. Fig. 3 is a plan of the outer vessel with its cover and the rotatable drum removed. Fig. 4 is a plan of the apparatus, its cover being represented in position. Fig. 5 is a bottom plan of the cover of the apparatus.

Throughout the drawings and specification the same numerals of reference denote like parts.

Referring more particularly to the parts, 1 represents the body of the apparatus which consists, preferably, of a substantially cylindrical vessel or barrel, having an enlarged filling spout or hopper 2 at one side and near the lower portion thereof, as indicated. In the center of this outer vessel or barrel 1 there is provided a pivot or spindle 3, the base 4 whereof is attached to the bottom of the vessel, as shown, which base is enveloped by a strainer 5 of conical form, the purpose of which will appear more fully hereinafter.

Within the vessel 1 there is placed a rotatable drum 6, the same comprising an outer cylindrical wall 7 and an inner cylindrical wall 8, the latter of which is preferably corrugated horizontally, as shown. From this arrangement an annular space 9 is formed, surrounding the inner corrugated wall. This drum 6 has a reëntrant bottom 10, whereby the lower edge 11 of the outer wall 7 overhangs or depends downwardly beneath the bottom of the drum. In the said bottom 10, beneath the annular space 9 aforesaid, circumferentially-disposed openings 12 are formed, and beneath these openings a flange or spatter-ring 13 is attached, which projects downwardly from the bottom 10 in the same manner as the lower edge 11 aforesaid. In this manner an annular space 14 is formed on the under side of the bottom of the drum, near the outer edge thereof.

Just beneath the drum 7 a gutter 15 is formed, the same consisting substantially of a ring having a vertical flange 16, which projects upwardly into the aforesaid space 14. As indicated, this gutter is attached to the inner side of the wall of the body 1, and a spout 17 constitutes a drain for the gutter, as will be readily understood.

Centrally within the drum 7 there is arranged a vertical tubular member 18, which constitutes a sheath for the spindle 3 in the manner indicated, the said sheath being closed at its upper end in order to hold a bearing 19, which rests upon the conically-formed extremity 20 of the aforesaid spindle 3. In this manner a pivot-bearing is formed at this point. To the extremity of the sheath 18 a pair of transversely-disposed braces or tie-bars 21 are attached, the same consisting, preferably, of stout wire soldered in place, passing through the inner wall 8 and terminating in the outer wall 7. It should be understood that these braces 21 would be soldered to the inner and outer walls of the drum, so as to increase their rigidity. It may be stated also at this point that this drum 6 is removable, and in order to facilitate its being replaced the lower extremity of the sheath 18 is formed into an expanded or funnel-shaped mouth 22, as shown, which mouth would evidently operate as a guide in lowering the drum. In order to brace the spindle 3 and the channel 15, radially-disposed braces or straps 23 are provided, preferably formed of sheet metal, as indicated, and attached to the under side of the gutter, as shown.

The body 1 is surmounted by a head or cover 24, the same consisting of an annular body or bottom 25, having a marginal flange 26 and an enlarged opening or mouth 27, provided with a similar flange 28. Upon the under side of this cover there is provided an annular pipe or ring 29, which is adapted to receive water through a pipe connection 30, passing through the cover, as indicated. When the cover has been applied to the body, the pipe 29 disposes itself in the upper portion of the annular space 9 between the inner and outer walls of the rotatable drum. The under side of this pipe 29 is provided with a plurality of discharging-nipples 31, preferably disposed at an inclination and alternately in different directions in such a manner that a volume of water passing through said nipples would be projected in a substantially tangential manner against the walls of the drum. A circulating-pump 32 and pipe connections 33 and 34 enable water to be drawn from the lower portion of the body 1 and circulated through the apparatus, as will be readily understood, it being apparent that the water from the drum would return to the lower portion of the body through the openings 12, aforesaid. A suction-pipe 35 is used in this connection, the inlet-mouth whereof lies under the aforesaid strainer 5 for the purpose of excluding any small bodies suspended in the water. It should be understood that the force of the streams directed through the nipples 31 operates to produce a rotation of the drum 6.

Arrangement is made for delivering the cream to be treated upon the drum 6 in small streams or jets. To this end the body 25 of the aforesaid cover 24 is provided with downwardly-projecting jets or short spouts 36, the lower extremities whereof turn outwardly and are inclined in such a manner that their mouths lie adjacent to the inner surface of the inner wall 8 of the drum. These spouts are preferably four in number, disposed as indicated. Cream may be delivered upon this cover between the flanges 26 and 28 through a suitable pipe connection 37$^a$, and this cream of course finds its way immediately through the spouts 36 to the drum, for it should be understood that the upper extremities of the said spouts do not project above the body or bottom of the cover 25. Other spouts 37 are provided which are very similar to the spouts 36 already described; but these latter spouts are disposed in such a manner as to enable them to deliver cream upon the outer surface of the outer wall 7 of the drum and, unlike the spouts 36, the upper mouths of the spouts 37 are elevated above the bottom 25 of the cover, so that normally no cream would flow through these spouts unless the level of the same should rise sufficiently. From this arrangement it should be understood that normally the principal portion of the cream being treated would flow through the inner spouts 36 and over the corrugated inner wall 8. The cream which is delivered upon the inner side of the inner wall 8 of the drum finds outlet through radially-disposed sections of tubing 38, which lie upon the bottom 10 and pass through the outer wall 7 of the drum, which arrangement operates to deliver this cream above and into the aforesaid gutter 15. The cream which passes down the outer surface of the drum drops or is whirled off the edge 11, aforesaid.

It should be stated that the cover 24 is removable. It is intended to be applied to the body in the manner indicated most clearly in Fig. 1, the cover being of reduced diameter, so as to enter the mouth of the body, as shown. The upper edge of the flange 26 is provided with radially-projecting clips or ears 39, which are adapted to rest upon the upper edge of the wall of the body, so as to support the cover thereupon. These are preferably two in number, as indicated.

In using the apparatus as a cooler the lower portion of the body would receive a quantity of broken or cracked ice 40, (indicated in dotted lines in Fig. 1,) and the water accumulating from the melting of this ice would be drawn through the suction-pipe 35 to the pump 32 and circulated through the apparatus in the manner already described. When the apparatus is to be used as a pasteurizer, hot water would be placed in the body 1 instead of ice, and this would be circulated in the same manner as the cold water. At a suitable point near its bottom the body 1 would be provided with an overflow-spout 41, which could be plugged or allowed to remain open, as desired.

The operation of the apparatus should be clearly understood from the foregoing. It should be understood that the cream to be treated would be delivered upon the cover and finds its way through the spouts 36 and 37, respectively, to the inner surface and outer surface of the drum 6—that is, against the inner face of the corrugated wall 8 and against the outer face of the wall 7—and the said drum would be continuously rotated by the tangentially-projected streams of water forced through the apparatus by the circulating-pump 32. This circulating water would return to the bottom of the body 1 through the openings 12, and the spatter-ring 13, disposed near these openings, evidently affords means for effectually preventing any possibility of the water being thrown out by the centrifugal force so as to be caught in the gutter 15, intended for the cream. The cream passing down on the inner side of the drum passes through the pipe-sections 38 and falls upon the gutter, while the cream that passes down the outer wall 7 drops off the edge 11 into the same gutter 15. All the cream eventually finds its way through the drain-spout 17, at which point a receptacle may be hung to receive the cream, as will be readily understood.

A small handle 42 is provided at one side of the body 1, located opposite to the spout 2, which handle facilitates emptying the contents of the body, as will be readily understood.

Thus it will be seen that the drum with its inner wall 8 and outer wall 7 set apart as they are forms a rotatable receptacle, having formed therewith a surrounding compartment which comprises, essentially, a rotatable water-jacket, upon the inside wall and upon the outside wall whereof the milk or cream to be heated or cooled is fed in a thin stream and flows thence downwardly into the gutter 15 direct or through the tubes 38, which tubes lead from the interior of the drum to the gutter.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In an apparatus of the class described, a liquid-receptacle, a superposed shell supported thereby, a rotatable drum supported in said shell, a water-jacket surrounding said drum, means for supplying fluids to the interior of said water-jacket, and means for supplying a plurality of streams of fluid to both walls of said water-jacket.

2. In an apparatus of the class described, a fluid-receptacle, a superposed casing, a supporting-shaft within said receptacle projecting upwardly within said casing, a drum supported by said shaft, a water-jacket surrounding said drum, means for directing fluid to the interior of said water-jacket, a cover supported above said drum, fluid-conduits leading from said cover and adapted to direct fluids from said cover against the exterior and interior walls of said water-jacket.

3. In an apparatus of the class described, a supporting-shaft, a rotatable drum supported thereby, a water-jacket surrounding said drum, conduits leading from the interior of said drum through said water-jacket, means for supplying fluid to the interior of said water-jacket, and means for directing fluids against the interior and exterior walls of said water-jacket.

4. In an apparatus of the class described, a compartment for cooling fluids, a shaft projected thereabove, an annular channel above said fluid-compartment, a rotatable drum supported relatively above said channel, a water-jacket surrounding said drum, conduits leading from the interior of said drum through said water-jacket, and means for supplying a plurality of streams of fluid to the interior of said water-jacket and against both walls thereof.

5. In apparatus of the class described, in combination, a body, a drum rotatably mounted therein upon a substantially vertical axis, said drum having a bottom, an outer wall projecting therebelow, and an inner wall, means for discharging circulating water in the space between the walls of said drum, said bottom being open between said walls, means for passing a liquid substance over the outer surface of said outer wall, and the inner surface of said inner wall, said drum having openings through said inner and outer walls whereby the liquid may pass through said walls, a circumferentially-disposed gutter lying beneath the lower edge of said outer wall, and a spatter-ring lying adjacent to said gutter and adapted to shield the same from said circulating water.

6. In apparatus of the class described, in combination, a body, a drum rotatably mounted therein upon a substantially vertical axis, said drum having a bottom, an inner wall and an outer wall, and openings through said bottom between said walls, means for discharging circulating water between said walls near the upper portion of said drum, means for delivering a liquid substance to the inner side of said inner wall and the outer side of said outer wall, tubular members constituting ducts leading through the walls of said drum, a gutter disposed near the lower edge of said drum, and adapted to receive said liquid substance, and a spatter-ring attached to the under side of said bottom between said openings and said gutter.

7. In apparatus of the class described, in combination, a body, a drum rotatably mounted therein upon a substantially vertical axis, said drum having a bottom, an inner corrugated wall and an outer wall, with openings through said bottom between said walls, ducts leading from the interior of said drum through said walls, means for discharging circulating water between said inner and outer walls, a cover adapted to receive a liquid substance and disposed above the upper edges of said walls, spouts leading therefrom and adapted to deliver said liquid substance upon the walls of said drum, a circumferentially-disposed gutter beneath the edge of said drum, and a spatter-ring attached to said bottom between said openings and said gutter.

8. In an apparatus of the class described, a casing, a rotatable drum thereon having a centrally-disposed pivot-spindle, a water-jacket surrounding said drum, means for causing a circulation of water through said water-jacket, a cover supported relatively above said water-jacket, means for delivering a plurality of streams of liquid against the walls of said water-jacket, and a gutter disposed beneath said drum and adapted to collect said liquid.

9. In apparatus of the class described, in combination, a body, a drum rotatably mounted therein upon a substantially vertical axis, said drum having an inner and an outer wall, a cover disposed above said body, a circumferentially-disposed pipe carried on the under side thereof, and disposed between said walls, said pipe having nipples adapted to deliver circulating water upon said walls, said cover being adapted to receive a liquid substance, spouts leading from said cover, and adapted to deliver said liquid substance upon the outer side of said outer wall, and the inner side of said inner wall, ducts at the bottom of said drum leading from the inner side of said inner wall to the outer side of said outer wall, and a gutter attached to said body, and adapted to collect said liquid substance from said outer wall.

In witness whereof I have hereunto set my hand in the presence of two witnesses.

JOSEPH GEORGES BOUCHARD.

Witnesses:
   T. Mynard,
   M. McAleer.